(12) United States Patent
Huo et al.

(10) Patent No.: US 11,882,304 B2
(45) Date of Patent: *Jan. 23, 2024

(54) IMAGE CODING/DECODING METHOD, CODER, DECODER, AND STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Yanzhuo Ma, Guangdong (CN); Shuai Wan, Guangdong (CN); Wei Zhang, Guangdong (CN); Fuzheng Yang, Guangdong (CN); Haixin Wang, Guangdong (CN); Yu Sun, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 62 days.

This patent is subject to a terminal disclaimer.

(21) Appl. No.: 17/463,146

(22) Filed: Aug. 31, 2021

(65) Prior Publication Data
US 2021/0400297 A1 Dec. 23, 2021

Related U.S. Application Data

(63) Continuation of application No. 17/230,769, filed on Apr. 14, 2021, now Pat. No. 11,159,814, which is a (Continued)

(51) Int. Cl.
H04N 19/50 (2014.01)
H04N 19/176 (2014.01)

(52) U.S. Cl.
CPC .......... *H04N 19/50* (2014.11); *H04N 19/176* (2014.11)

(58) Field of Classification Search
CPC ........................... H04N 19/50; H04N 19/176
See application file for complete search history.

(56) References Cited

U.S. PATENT DOCUMENTS

| 2016/0227251 A1 | 8/2016 | Lee et al. |
| 2018/0309995 A1 | 10/2018 | He et al. |

(Continued)

FOREIGN PATENT DOCUMENTS

| CN | 102934430 A | 2/2013 |
| CN | 107079165 A | 8/2017 |

(Continued)

OTHER PUBLICATIONS

Bross, B. et al. "Versatile Video Coding (Draft 5)" JVET-N1001-v7; Geneva, CH, Mar. 19-27, 2019. 383 pages.

(Continued)

*Primary Examiner* — Nam D Pham
(74) *Attorney, Agent, or Firm* — PERKINS COIE LLP

(57) ABSTRACT

Provided are a picture encoding and decoding method, an encoder, a decoder and a storage medium. The decoder decodes a bitstream to obtain a size, a coding mode, and residuals of a current block; when the coding mode of the current block is an MIP mode, calculates a second offset based on the size of the current block, a first offset and reconstructed values of adjacent pixels corresponding to the current block; determines a first prediction value of the current block according to the second offset; and determines a reconstructed value of the current block based on the first prediction value.

20 Claims, 5 Drawing Sheets

Related U.S. Application Data continuation of application No. PCT/CN2019/107612, filed on Sep. 24, 2019.

(56) References Cited

U.S. PATENT DOCUMENTS

| 2019/0068989 | A1 | 2/2019 | Lee |
| 2020/0252654 | A1* | 8/2020 | Su .................. H04N 19/117 |

FOREIGN PATENT DOCUMENTS

| CN | 108702509 | A | 10/2018 |
| CN | 109792520 | A | 5/2019 |
| CN | 109804624 | A | 5/2019 |
| RU | 2586029 | C1 | 6/2016 |
| WO | 2014052806 | A1 | 4/2014 |
| WO | 2017209328 | A1 | 12/2017 |
| WO | 2018066958 | A1 | 4/2018 |
| WO | 2018134362 | A1 | 7/2018 |
| WO | 2021040941 | A1 | 3/2021 |

OTHER PUBLICATIONS

Examination Report No. 1 for Australian Application No. 2019467372 dated Nov. 24, 2021. 2 pages.

Extended European Search Report for European Application No. 19946790.3 dated Jan. 20, 2022. 10 pages.

Huo, J. et al. "Non-CE3: Fixed downshifting for 8-bit MIP" JVET-O1127-v1; Gothenburg, SE, Jul. 3-12, 2019. 5 pages.

Huo, J. et al. "Non-CE3: Unification of shifting for MIP mode" JVET-OO323-v2; Jul. 3-12, 2019; Gothenburg, SE. 4 pages.

Huo, J. et al. "On fixed sW and fO in MIP" JVET-Q0450-v2; Jan. 7-17, 2020; Brussels, BE. 5 pages.

JVET "Test Model 5 of Versatile Video Coding (VTM 5)" ISO/IEC JTC1/SC29/WG11 N18371; Mar. 2019; Geneva, CH. 77 pages.

First Office Action for Chinese Application No. 202110629410.2 dated Sep. 28, 2022. 18 pages with English translation.

Huo, J. et al. "Non-CE3: Fixed downshifting for 8-bit MIP" JVET-O1127-v2; JVET of ITU-T SG 16 WP 3 and ISO/IEC JTC 1/SC 29/WG 11; 15th Meeting; Gothenburg, SE; Jul. 3-12, 2019. 6 pages.

Notice of Reasons for Refusal for Japanese Application No. 2021-532342 dated Aug. 2, 2022. 8 pages with English translation.

Pfaff, J. et al. "8-bit implementation and simplification of MIP" JVET-O0084; JVET of ITU-T SG 16 WP 3 and ISO/IEC JTC 1/SC 29/WG 11; 15th Meeting; Gothenburg, SE; Jul. 3-12, 2019. 3 pages.

Pfaff, J. et al. "8-bit implementation and simplification of MIP" JVET-O0084-R2; JVET of ITU-T SG 16 WP 3 and ISO/IEC JTC 1/SC 29/WG 11; 15th Meeting; Gothenburg, SE; Jul. 3-12, 2019. 8 pages.

Yun, Z. et al. "Study on the Development of Video Coding Standard VVC" Content Production & Broadcasting; 2018, vol. 45, No. 9, 15 pages with English translation.

Bross, B. et al. "Versatile Video Coding (Draft 6)" JVET-O2001-vE; Jul. 3-12, 2019. 456 pages.

First Office Action for Russian Application No. 2021113334 dated Sep. 17, 2021. 9 pages with English translation.

Fraunhofer HHI "CE3: Affine linear weighted intra prediction (CE3-4.1, CE3-4.2)" JVET-N0217; Mar. 19-27, 2019. 29 pages.

Fraunhofer HHI et al. "Non-CE3: Simplifications of MIP" JVET-O0925-r3; Jul. 3-12, 2019. 4 pages.

Notice of Allowance dated Jun. 23, 2021 of U.S. Appl. No. 17/230,769, filed Apr. 14, 2021.

International Search Report, of PCT/CN2019/107612, dated Jun. 23, 2020, 5 pages.

Salehifar, Mehdi, et al., "CE3 Related: Low Memory and Computational Complexity Matrix Based Intra Prediction (MIP)", Joint Video Experts Team (JVET) of ITU-T SG 16 WP3 and ISO/IEC JTC 1/SC 29/WG 11 15th Meeting: Gothenburg, SE, pp. 1-8.

First Examination Report of the Indian application No. 202127017826, dated Apr. 29, 2022. 7 pages with English Translation.

Japanese Patent Application No. 2021-532342 Second Office Action dated Mar. 3, 2023, pp. 1-8.

Korean Application No. 10-2021-7015292 First Office Action dated Mar. 24, 2023, pp. 1-11.

First Office Action of the Malaysia application No. PI2021002052, dated Aug. 4, 2023. 2 pages.

First Office Action of the Vietnam application No. 1-2021-02392, dated Aug. 14, 2023. 4 pages with English translation.

First Office Action of the Israel application No. 282280, dated Jul. 16, 2023. 4 pages.

Decision of Rejection of the Japanese application No. 2021-532342, dated Sep. 15, 2023. 6 pages with English translation.

Examination report for European application No. 19946790.3 dated Nov. 21, 2023, 6 Pages.

Kenji Kondo et al: "CE3-2: On rounding shift of MIP" ; JVET-P0056-v1; Joint Video Experts Team (JVET) of ITU-T SG 16 WP 3 and ISO/IEC JTC 1/SC 29/WG 11, 16th Meeting: Geneva, CH, Oct. 1-11, 2019, 4 Pages.

* cited by examiner

IMAGE CODING/DECODING METHOD, CODER, DECODER, AND STORAGE MEDIUM

CROSS-REFERENCE TO RELATED APPLICATIONS

This application is a continuation application of U.S. application Ser. No. 17/230,769 filed on Apr. 14, 2021, which is a continuation application of International PCT Application No. PCT/CN2019/107612 filed on Sep. 24, 2019. The entire contents of the above-identified applications are hereby incorporated by reference.

TECHNICAL FIELD

Embodiments of the present application relate to the technical field of video encoding and decoding, in particular to a picture encoding and decoding method, an encoder, a decoder and a storage medium.

BACKGROUND

In a Versatile Video Coding (VVC) Test Model, a new intra coding technology, namely Matrix-based Intra Prediction (MIP), is proposed. The MIP is an intra prediction technology based on a neural network, i.e., predicting a luma value of a current block by using a multilayer neural network based on adjacent reconstructed luma blocks. Specifically, like the conventional intra mode, when the MIP mode is used for intra prediction, input of the MIP prediction is also data of adjacent luma blocks in the above row and the left column of the current block, and output of the MIP prediction is a first prediction value of a luma component of the current block. The specific prediction process is divided into three steps: downsampling, matrix vector multiplication and interpolation.

However, when luma prediction is performed using the MIP mode, parameters used for luma blocks with different sizes may also be different. Therefore, a relatively large storage space is required to be occupied for storing a large quantity of parameters, while search and invocation of parameters in the prediction process also increase the overall time, thus reducing the encoding and decoding efficiency.

SUMMARY

Embodiments of the present application provide a picture encoding and decoding method, an encoder, a decoder and a storage medium.

An embodiment of the present application provides a picture encoding method, which is applicable to an encoder, the method including: determining a size of a current block; determining a first offset according to the size of the current block when encoding the current block by using an MIP mode; calculating a second offset by using the first offset and reconstructed values of adjacent pixels corresponding to the current block; determining a first prediction value of the current block according to the second offset; and encoding the current block based on the first prediction value.

An embodiment of the present application provides a picture decoding method, which is applicable to a decoder, the method including: decoding a bitstream to obtain a size and a coding mode of a current block; determining a first offset according to the size of the current block when the coding mode of the current block is an MIP mode; calculating a second offset by using the first offset and reconstructed values of adjacent pixels corresponding to the current block; determining a first prediction value of the current block according to the second offset; and determining a reconstructed value of the current block based on the first prediction value.

An embodiment of the present application provides an encoder, including: a first determining part, a first calculating part and an encoding part. The first determining part is configured to determine a size of a current block, and determine a first offset according to the size of the current block when encoding the current block by using an MIP mode. The first calculating part is configured to calculate a second offset by using the first offset and reconstructed values of adjacent pixels corresponding to the current block. The first determining part is further configured to determine a first prediction value of the current block according to the second offset. The encoding part is configured to encode the current block based on the first prediction value.

An embodiment of the present application provides a decoder, including: a parsing part, a second determining part and a second calculating part. The parsing part is configured to decode a bitstream to obtain a size and a coding mode of a current block. The second determining part is configured to determine a first offset according to the size of the current block when the coding mode of the current block is an MIP mode. The second calculating part is configured to calculate a second offset by using the first offset and reconstructed values of adjacent pixels corresponding to the current block. The second determining part is further configured to determine a first prediction value of the current block according to the second offset, and determine a reconstructed value of the current block based on the first prediction value.

An embodiment of the present application provides an encoder, including a first processor, a first memory configured to store instructions executable by the first processor, a first communication interface, and a first bus configured to connect the first processor, the first memory and the first communication interface, wherein when the instructions are executed by the first processor, the picture encoding method is implemented.

An embodiment of the present application provides a decoder, including a second processor, a second memory configured to store instructions executable by the second processor, a second communication interface, and a second bus configured to connect the second processor, the second memory and the second communication interface, wherein when the instructions are executed by the second processor, the picture decoding method is implemented.

An embodiment of the present application provides a computer-readable storage medium, on which a program applicable to an encoder and a decoder is stored, when the program is executed by a processor, the picture encoding and decoding method is implemented.

DETAILED DESCRIPTION

Figure 1:
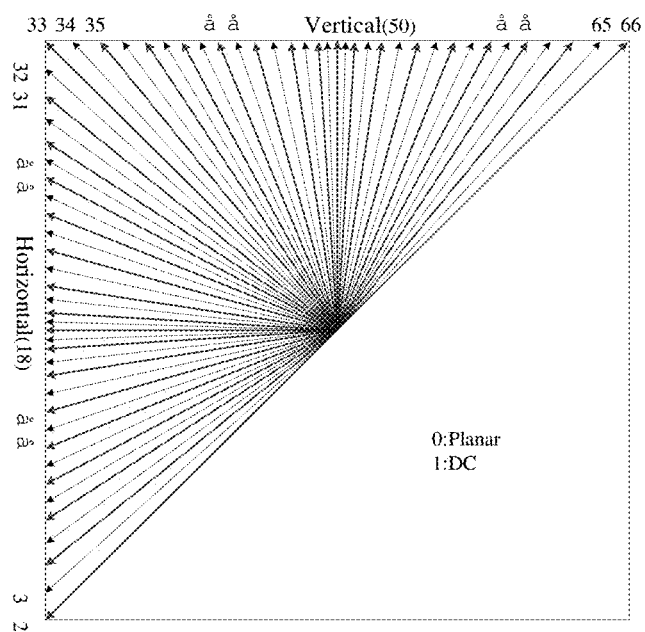
FIG. 1 is a schematic diagram of arrangement of 67 prediction modes in intra prediction.

Technical solutions in the embodiments of the present application will be clearly and completely described below with reference to the drawings of the embodiments of the present application. It may be understood that the specific embodiments described here are only used to explain the relevant application, rather than limit the application. In addition, it should also be noted that for convenience of description, only the parts related to the relevant application are shown in the drawings.

For video pictures, Affine Linear Weighted Intra Prediction proposed in the Joint Video Experts Team (JVET)-N0217 has been accepted in VVC, and is renamed as Matrix-based Intra Prediction, i.e., MIP technology. In this technology, different quantities of matrix-based intra prediction modes are added in the process of intra luma prediction according to different sizes of intra luma coding blocks.

In order to capture a finer edge direction presented in a natural video, in the VVC, 33 angular intra luma prediction modes defined in High Efficiency Video Coding (HEVC) is expanded to 65 angular intra luma prediction modes. FIG. 1 is a schematic diagram of an arrangement of 67 prediction modes in intra prediction. As shown in FIG. 1, arrows numbered 2-66 represent 65 angular intra prediction modes, and there are also two non-angular modes, i.e., a planar mode numbered 0 and a direct current (DC) mode numbered 1. Therefore, the intra prediction process in the VVC includes 2 non-angular modes and 65 angular modes. Here, these 67 prediction modes are called conventional intra prediction modes.

The MIP is an intra prediction technology based on a neural network, i.e., predicting a luma value of a current block by using a multilayer neural network based on adjacent reconstructed pixels. Specifically, in the MIP technology, intra luma coding blocks are divided into three types according to sizes of the luma coding blocks. Assuming that the size of a luma coding block is W×H, wherein W is a width parameter and H is a height parameter, luma coding blocks may be divided into three types according to the sizes of the luma coding blocks.

Luma coding blocks with a size of 4×4 are first-type luma blocks, luma coding blocks with a size of 8×4, 4×8 or 8×8 are second-type luma blocks, and luma coding blocks with other sizes are third-type luma blocks.

For these three types of intra luma coding blocks, in the MIP technology, M types of MIP modes are added on the basis of the 67 conventional intra prediction modes, wherein for the first-type luma blocks, M=35; for the second-type luma blocks, M=19; and for the third-type luma blocks, M=11.

Specifically, the MIP technology is only used for intra luma prediction, and like in the conventional modes, the input of MIP prediction is also data in the above row and the left column of a current block, and the output is a prediction value of the current block. The specific prediction process is divided into three steps: averaging, matrix vector multiplication and interpolation. That is, by performing the three-step operation on the input reconstructed luma values of adjacent pixels in the above row and the left column, a luma component prediction value of the current block may be obtained.

Figure 2:
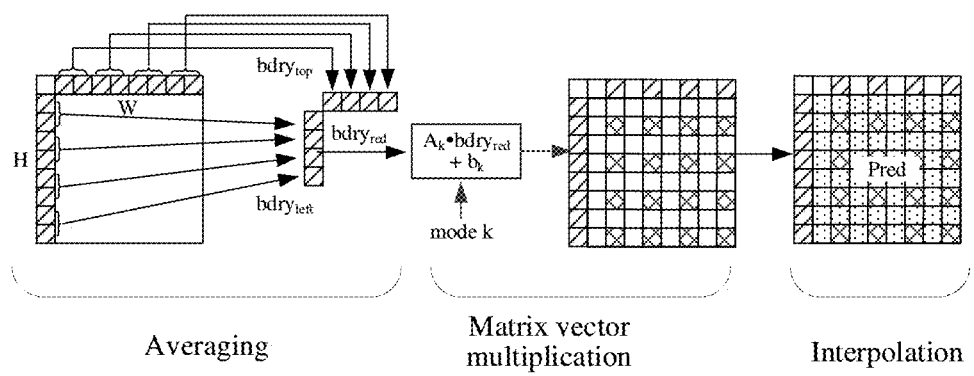
FIG. 2 is a schematic flow chart of encoding by using an MIP mode.

FIG. 2 is a schematic flow chart of encoding by using an MIP mode. As shown in FIG. 2, the specific implementation of performing luma prediction by using the MIP mode is as follows.

In step 1, an averaging operation is performed on above adjacent reference samples of the current block to obtain a vector $bdry_{top}$, having N values in total; and an averaging operation is performed on left adjacent reference samples of the current block to obtain a vector $bdry_{left}$, having N values in total. When the current block is the first-type luma coding block, N=2; and when the current block is the second-type or third-type luma coding block, N=4. The vector $bdry_{top}$ and the vector $bdry_{left}$ form a new vector $bdry_{red}$ for the subsequent operations.

In step 2, corresponding matrix $A_k$ and offset $b_k$ are acquired through a mode number k of the MIP mode, and partial prediction values of the current block identified by cross lines in FIG. 2 are obtained by calculation with the following formula (1):

$$\text{Pred}_{red} = A_k \cdot \text{bdry}_{red} + b_k \tag{1}$$

In step 3, the remaining prediction values $\text{Pred}_{red}$ in the current block are obtained by linear interpolation.

It should be noted that, in the implementation process of encoding the current block, which coding mode is specifically used in intra prediction should be written into a compressed bitstream, so that a decoder can determine, by parsing the mode information, which mode is specifically used, and whether the mode is a conventional mode or an MIP mode. If the mode is a conventional mode, which specific type of conventional mode is used is determined; and if the mode is an MIP mode, which specific type of MIP mode is used is determined.

In the intra prediction of the VVC, comparison of Rate Distortion cost (RDcost) in 67 conventional modes and M types of MIP modes is performed for each luma coding block, to select an optimal mode from the 67 conventional modes and M types of MIP modes for encoding. In order to save bit overhead, Most Probable Modes List (MPM)-based intra mode coding technology is used in the VVC.

It should be noted that since the extend reference line technology and the Intra Sub-Partitionar (ISP) technology are only used for modes in the MPM list, when extendrefflag and ispflag are both 0, i.e., when zero reference line is used and no sub-block partition is performed, there is no need to encode mpmflag, and the position of the optimal mode in the MPM list is directly encoded.

Further, with regard to constructions of the MPM list and MIPMPM list, in the luma intra prediction of VVC, if the optimal mode selected by the current block is a conventional mode, an MPM list containing six most probable conventional modes needs to be constructed. If the optimal mode selected by the current block is an MIP mode, an MIPMPM list containing three most probable MIP modes needs to be constructed.

Figure 3:
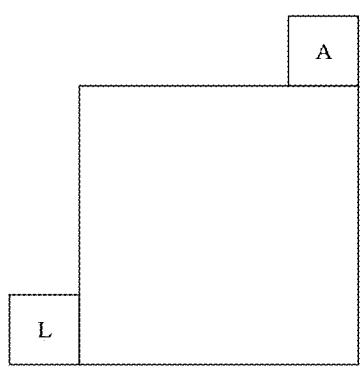
FIG. 3 is a schematic diagram of arrangement of an above adjacent luma block and a left adjacent luma block of a current block.

FIG. 3 is a schematic diagram of arrangement of an above adjacent luma block and a left adjacent luma block of a current block. As shown in FIG. 3, the two lists mentioned above are both derived according to the optimal modes of the above adjacent luma block (A) and the left adjacent luma block (L) of the current block as shown in FIG. 3.

Further, with regard to the construction of the MIPMPM list, in VVC intra prediction, if the optimal mode of the current block is an MIP mode, the MIPMPM list needs to be constructed. In the process of constructing the MIPMPM list, the MIP mode ABOVE_MIP corresponding to the optimal mode of the above adjacent luma block and the MIP mode LEFT_MIP corresponding to the optimal mode of the left adjacent luma block need to be acquired first.

Further, after LEFT_MIP and ABOVE_MIP are acquired, an MIPMPM list containing three most probable MIPMPM modes is constructed according to the following method, in which the numbers in MIPMPM are the numbers of the MIP modes, wherein the numbers of the MIP modes ranges from 0 to (M−1), with the first-type luma blocks being numbered 0-34, the second-type luma blocks being numbered 0-18, and the third-type luma blocks being numbered 0-10:

if LEFT_MIP is available (not being −1), putting LEFT_MIP into MIPMPMlist;

if AB OVE_MIP is available (not being −1), putting ABOVE_MIP into MIPMPMlist after redundancy check; and if LEFT_MIP is unavailable (being −1) and ABOVE_MIP is unavailable (being −1), according to the type of the current block, adding a default list into MIPMPMlist after redundancy check until MIP_MPMlist is full:

the default list of the first-type luma blocks is: {17, 34, 5};

the default list of the second-type luma blocks is: {0, 7, 16}; and the default list of the third-type luma blocks is: {1, 4, 6}.

Figure 4:
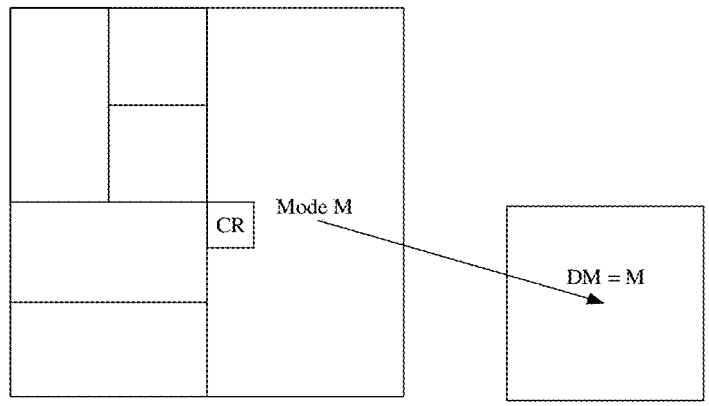
FIG. 4 is a schematic diagram of arrangement for determining a DM mode.

Further, it should be added that there is a Direct Mode (DM) using inter-component correlation in VVC chroma intra prediction process, which may use the intra prediction mode of a center position of a collocated luma coding block corresponding to the current block to perform intra prediction of a current chroma block. FIG. 4 is a schematic diagram of arrangement for determining a DM mode. As shown in FIG. 4, since the MIP technology is only used in luma coding blocks, when the intra prediction mode at a CR position in FIG. 4 is an MIP mode, the MIP mode needs to be mapped to a conventional mode through an "MIP-conventional mapping table" to perform intra prediction of the current chroma block. Table 1 is the MIP-conventional mapping table.

TABLE 1

| Conventional mode | MIP mode | | |
| --- | --- | --- | --- |
| | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

That is, due to the introduction of the MIP technology, in the intra prediction process, a conventional mode needs to be mapped to an MIP mode in constructing of an MIPMPM list, and an MIP mode needs to be mapped to a conventional mode in constructing of an MPM list and determining a DM mode.

In addition, mapping from MIP modes to conventional modes needs to be used in the process of constructing the MPM list and the process of acquiring the DM mode. Specifically, 35/19/11 types of MIP modes are mapped to 67 conventional modes through the "MIP-conventional mapping table". For the three types of luma blocks, three "MIP-conventional mapping tables" are shown in Table 2, Table 3 and Table 4.

TABLE 2

| MIP mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Conventional mode | 0 | 18 | 18 | 0 | 18 | 0 | 12 | 0 | 18 | 2 | 18 | 12 | 18 | 18 | 1 | 18 | 18 | 0 |
| MIP mode | 18 | 19 | 20 | 21 | 22 | 23 | 24 | 25 | 26 | 27 | 28 | 29 | 30 | 31 | 32 | 33 | 34 | |
| Conventional mode | 0 | 50 | 0 | 50 | 0 | 56 | 0 | 50 | 66 | 50 | 56 | 50 | 50 | 1 | 50 | 50 | 50 | |

TABLE 3

| MIP mode | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Conventional mode | 0 | 1 | 0 | 1 | 0 | 22 | 18 | 18 | 1 | 0 | 1 | 0 | 1 | 0 | 44 | 0 | 50 | 1 | 0 |

TABLE 4

| MIP mode | 0 | 1 | 2 | 3 | 4 | 5 | 6 | 7 | 8 | 9 | 10 |
|---|---|---|---|---|---|---|---|---|---|---|---|
| Conventional mode | 1 | 1 | 1 | 1 | 18 | 0 | 1 | 0 | 1 | 50 | 0 |

Figure 5:
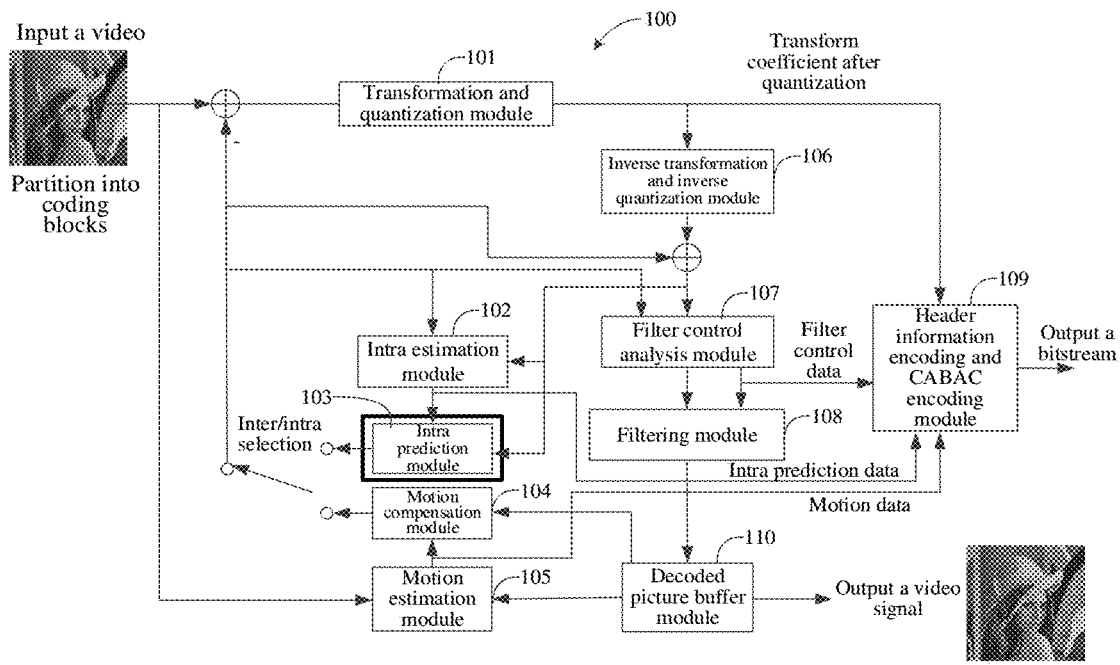
FIG. 5 is a schematic structural diagram of a video encoding system.
Figure 6:
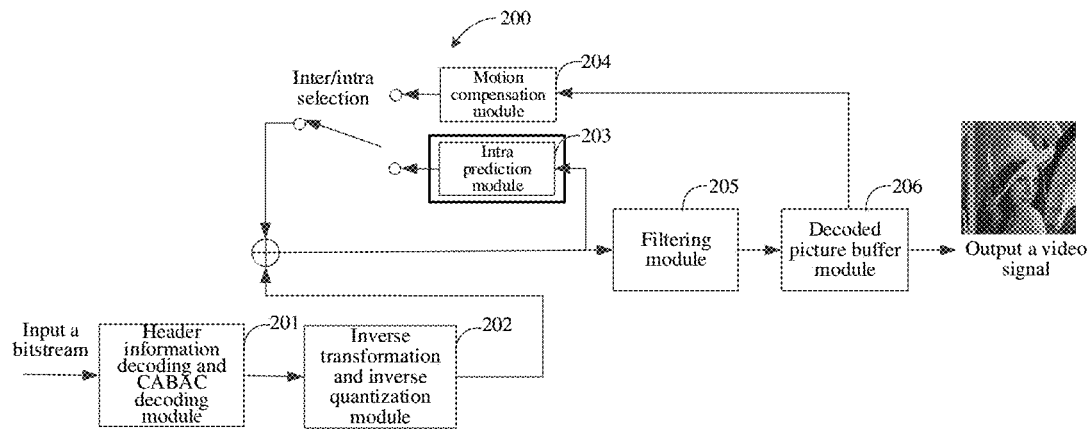
FIG. 6 is a schematic structural diagram of a video decoding system.

FIG. 5 is a schematic diagram of a structure of a video encoding system. As shown in FIG. 5, the video encoding system 100 includes components such as a transformation and quantization module 101, an intra estimation module 102, an intra prediction module 103, a motion compensation module 104, a motion estimation module 105, an inverse transformation and inverse quantization module 106, a filter control analysis module 107, a deblocking filtering and Sample Adaptive Offset (SAO) filtering module 108, a header information encoding and Context-based Adaptive Binary Arithmetic Coding (CABAC) encoding module 109, and a decoded picture buffer module 110. FIG. 6 is a schematic diagram of a structure of a video decoding system. As shown in FIG. 6, the video decoding system 200 includes components such as a header information decoding and CABAC decoding module 201, an inverse transformation and inverse quantization module 202, an intra prediction module 203, a motion compensation module 204, a deblocking filtering and SAO filtering module 205, and a decoded picture buffer module 206. After a video picture is processed by the parts in the video encoding system 100, such as the transformation and quantization module 101, the intra estimation module 102, the intra prediction module 103, the motion compensation module 104, the motion estimation module 105, the deblocking filtering and SAO filtering module 108 and the header information encoding and CABAC encoding module 109, a bitstream of the video picture is output. The bitstream is input into the video decoding system 200 and processed by the parts in the video decoding system 200, such as the header information decoding and CABAC decoding module 201, the inverse transformation and inverse quantization module 202, the intra prediction module 203 and the motion compensation module 204, and is finally restored to the original video picture.

According to the height parameter and the width parameter, the current block may have 25 sizes. Specifically, it is specified in the standard that the maximum size of the luma block is 128×128. However, the maximum size of a transformation unit is 64×64, that is, a luma block with the size of 128×128 must be subjected to quadtree partitioning first, so the maximum size of the luma block is 64×64. Table 5 is a schematic table of the sizes of the luma block, which are as shown in Table 5,

TABLE 5

| (4 × 4) | (4 × 8) | (4 × 16) | (4 × 32) | (4 × 64) |
|---|---|---|---|---|
| (8 × 4) | (8 × 8) | (8 × 16) | (8 × 32) | (8 × 64) |
| (16 × 4) | (16 × 8) | (16 × 16) | (16 × 32) | (16 × 64) |
| (32 × 4) | (32 × 8) | (32 × 16) | (32 × 32) | (32 × 64) |
| (64 × 4) | (64 × 8) | (64 × 16) | (64 × 32) | (64 × 64) |

In the prior art, MIP modes are limited according to the height parameter and the width parameter of the current block. Specifically, if a width-height ratio of the current block is greater than 4 or a height-width ratio of the current block is greater than 4, the current block will not be encoded by the MIP mode. Table 6 shows a limitation on the sizes of the luma blocks in the MIP mode in the prior art, which are as shown in Table 6,

TABLE 6

| (4 × 4) | (4 × 8) | (4 × 16) | ~~(4×32)~~ | ~~(4×64)~~ |
|---|---|---|---|---|
| (8 × 4) | (8 × 8) | (8 × 16) | (8 × 32) | ~~(8×64)~~ |
| (16 × 4) | (16 × 8) | (16 × 16) | (16 × 32) | (16 × 64) |
| ~~(32×4)~~ | (32 × 8) | (32 × 16) | (32 × 32) | (32 × 64) |
| ~~(64×4)~~ | ~~(64×8)~~ | (64 × 16) | (64 × 32) | (64 × 64) |

In the prior art, among the first-type luma blocks (corresponding to 4×4 luma blocks) of the MIP mode, there are two above adjacent luma blocks and two left adjacent luma blocks, and 4×4 prediction blocks are generated through a matrix operation. Among the second-type luma blocks (corresponding to 4×8, 8×4, 8×8 luma blocks) of the MIP mode, there are four above adjacent luma blocks and four left adjacent luma blocks, and 4×4 prediction blocks are generated through a matrix operation. In the third-type luma blocks (corresponding to luma blocks of other sizes) of the MIP mode, there are four above adjacent luma blocks and four left adjacent luma blocks, and 4×8 prediction blocks (4×16 luma blocks), 8×4 prediction blocks (16×4 luma blocks) or 8×8 prediction blocks (luma blocks of other sizes) are generated through a matrix operation. Since non-square prediction blocks will be generated from the third-type luma blocks, odd-numbered rows of the matrix need to be extracted during calculation.

Further, in syntax, an application category of MIP may be represented by MipSizeId, that is, MipSizeId is an MIP block size index, numModes represents the quantity of MIP modes, boundarySize represents the quantity of luma blocks in the above reference row or left reference column obtained by downsampling, predW represents the width parameter of a prediction block, predH represents the height parameter of the prediction block, and predC represents the side length of the MIP matrix. Table 7 shows a syntax relation corresponding to the MIP modes in the prior art. As shown in Table 7, MipSizeId, numModes, boundarySize, predW, predH and predC in the syntax have the following relation:

TABLE 7

| MipSizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | Min (nTbW, 8) | Min (nTbH, 8) | 8 |

Further, in the syntax, the MIP block size index being 0 represents 4×4 luma blocks, the MIP block size index being 1 represents 4×8, 8×4, 8×8 luma blocks, and the MIP block size index being 2 represents luma blocks of other sizes. The numModes indicates how many MIP prediction modes there are in total, that is, there are totally 35 luma blocks of 4×4, 19 luma blocks of 4×8, 8×4, 8×8, and 11 luma blocks of other sizes. The boundarySize indicates that the adjacent luma blocks in the above row or the left column of the current block are finally downsampled into 2 or 4 adjacent luma blocks.

In the prior art, when the encoder performs luma prediction through an MIP mode, the following formula (2) may be used:

$$predMip[x][y] = (((\Sigma_{i=0}^{inSize-1} mWeight[i][y^*incH^*predC+x^*incW]^*p[i])+oW)>>sW) + pTemp[0] \quad (2)$$

wherein mWeight and vBias are respectively a weight matrix and a bias matrix trained by deep learning for each MIP mode. Specifically, mWeight is a weight matrix for each type of MIP modes, and vBias is a bias matrix for each type of MIP modes. sB is a left shift amount of the bias matrix, oW is a rounded retention value, sW is a right shift amount of an overall prediction value, and the values of sW in different MIP modes need to be obtained by looking up in tables.

On the basis of JVET-N1001-v7, at the time of generating a prediction matrix of MIP, an encoder determines, by variables incW and incH, whether the prediction values in odd-numbered rows need to be extracted, and a variable fO represents a numerical value that needs to be subtracted from mWeight, specifically:

$$oW = (1<<(sW-1)) - fO^*(\Sigma_{i=0}^{inSize-1} p[i]) \quad (3)$$

$$sincW = (predC > mipW)?2:1 \quad (4)$$

$$incH = (predC > mipH)?2:1 \quad (5)$$

if MipSizeId<2, then $$p[0] = pTemp[0] - (1<<(BitDepthY-1)) \quad (6)$$

$$p[x] = pTemp[x] - pTemp[0] \text{ for } x=1, inSize-1 \quad (7)$$

otherwise $$p[x] = pTemp[x+1] - pTemp[0] \quad (8)$$

wherein incW=2 or incH=2 represents that the extraction needs to be performed on the width parameter or the height parameter.

Table 8 shows a syntax description of sW in the prior art. As shown in Table 8, since the values of sW in the MIP mode have a mapping relationship, the values of sW in all modes may be obtained through Table 8.

TABLE 8

| | modeId | | | | | | | | | | | | | | | | | |
|---|---|---|---|---|---|---|---|---|---|---|---|---|---|---|---|---|---|---|
| MipSizeId | 0 | 1 | 2 | 3 | 4 | 5 | 6 | 7 | 8 | 9 | 10 | 11 | 12 | 13 | 14 | 15 | 16 | 17 |
| 0 | 6 | 6 | 6 | 5 | 6 | 5 | 5 | 6 | 5 | 6 | 6 | 6 | 6 | 5 | 6 | 5 | 5 | 5 |
| 1 | 6 | 6 | 6 | 6 | 6 | 6 | 6 | 6 | 6 | 7 | | | | | | | | |
| 2 | 7 | 5 | 6 | 6 | 6 | 6 | | | | | | | | | | | | |

Table 9 shows a syntax description of fO in the prior art. As shown in Table 9, in the process of calculating prediction values of MIP modes, the variable fO represents the numerical value that needs to be subtracted from mWeight, and the values of fO of different luma blocks in different MIP modes need to be obtained by looking up in the table. mWeight is a weight matrix trained by deep learning for each MIP mode.

It can be seen from the syntax description of fO in Table 9 that the value of fO is related to both the size of the luma block and the mode number.

TABLE 9

| | modeId | | | | | | | | | | | | | | | | | |
|---|---|---|---|---|---|---|---|---|---|---|---|---|---|---|---|---|---|---|
| MipSizeId | 0 | 1 | 2 | 3 | 4 | 5 | 6 | 7 | 8 | 9 | 10 | 11 | 12 | 13 | 14 | 15 | 16 | 17 |
| 0 | 34 | 21 | 7 | 27 | 27 | 28 | 56 | 13 | 47 | 15 | 40 | 21 | 16 | 7 | 45 | 66 | 21 | 32 |
| 1 | 17 | 20 | 11 | 45 | 17 | 11 | 23 | 10 | 21 | 11 | | | | | | | | |
| 2 | 8 | 46 | 16 | 10 | 13 | 11 | | | | | | | | | | | | |

Just because the value of fO in Table 9 is related to both the size of the luma block and the mode number, that is, the syntax descriptions of fO are different in different MIP modes, when the encoder performs the luma prediction through the MIP mode, the values of fO may be different for the current coding blocks with different MipSizeIds or different MIP mode numbers modeIds, thus resulting in an inconsistency in algorithm. Moreover, the flow of querying in the above Table 9 increases the time complexity of the algorithm, and the storage of Table 9 also needs to occupy a storage space.

It can be seen that in the prior art, when luma prediction is performed using the MIP mode, the parameters used for luma blocks with different sizes may also be different. Therefore, a relatively large storage space is required for storing a large number of parameters, and the search and invocation of parameters in the prediction process also increase the overall time, thus reducing the encoding and decoding efficiency.

In order to solve the above problem, the present application proposes a picture encoding method, in one aspect, an encoder may realize, in encoding, that the value of fO of the current block is only related to the size of the current block by setting the pre-stored indexes and offsets, i.e., by setting a correspondence relation between MipSizeId and fO, thus making the implementation of MIP more concise and unified; in another aspect, the correspondence relation between MipSizeId and fO may be stored by using a one-dimensional array or a data structure with similar functions, which reduces the dimension and saves the storage space occupied by fO itself; and in another aspect, when the encoder uniformly modifies and updates fO, the corresponding mWeight may also be updated using the updated fO, thereby avoiding the reduction in encoding performance.

Further, the picture encoding method proposed in the present application may affect an intra prediction part in a video encoding hybrid framework, that is, it is mainly used in the intra prediction module 103 in video encoding and the intra prediction module 203 in video decoding, and works on both the encoder and the decoder.

Technical solutions in embodiments of the present application will be clearly and completely described below with reference to the drawings in the embodiments of the present application.

Figure 7:
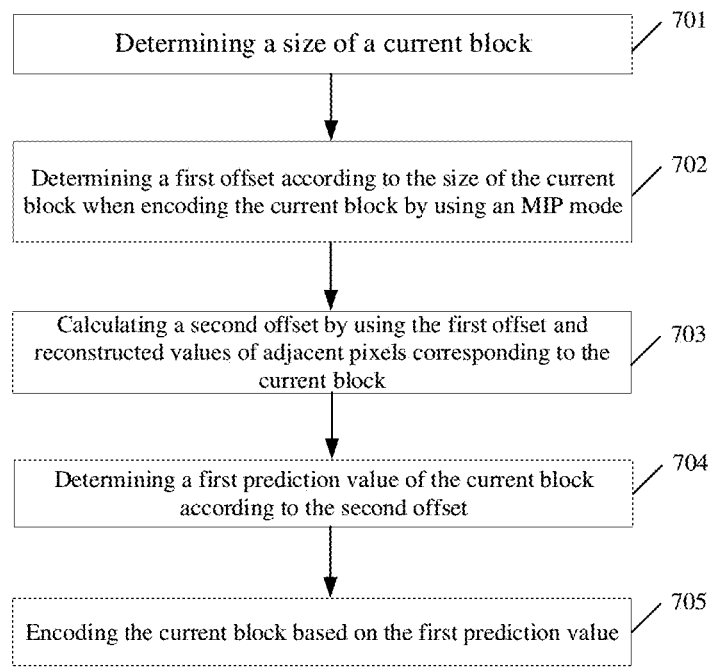
FIG. 7 is a schematic diagram of an implementation flow of a picture encoding method.

In an embodiment of the present application, FIG. 7 is a schematic diagram of an implementation flow of a picture encoding method. As shown in FIG. 7, in an embodiment of the present application, the picture encoding method performed by an encoder may include step 701 to step 705.

In step 701, a size of a current block is determined.

In an embodiment of the present application, the encoder may first determine the size of the current block, wherein the current block may be a current coding block to be encoded, that is, before the encoder encodes the current block, the specific size of the current block may be determined first.

Further, in an embodiment of the present application, the current block may be a luma block to be encoded.

It should be noted that in an embodiment of the present application, according to the height parameter H and the width parameter W of the current block, the current block may have 25 sizes. Specifically, it is specified in a standard that the maximum size of the current block is 128×128. However, since the maximum size of the transformation unit is 64×64, that is, the current block with the size of 128×128 must be subjected to quadtree partitioning first, the maximum size of the current block is 64×64.

Specifically, as shown in Table 5 above, the current block may have 25 sizes (H×W), including (4×4), (4×8), (4×16), (4×32), (4×64), (8×4), (8×8), (8×16), (8×32), (8×64), (16× 4), (16×8), (16×16), (16×32), (16×64), (32×4), (32×8), (32× 16), (32×32), (32×64), (64×4), (64×8), (64×16), (64×32) and (64×64).

In step 702, a first offset is determined according to the size of the current block when the current block is encoded using an MIP mode.

In an embodiment of the present application, when the encoder encodes the current block using the MIP mode, a first offset corresponding to the current block may be determined firstly according to the size of the current block. According to the above Formula (2), the first offset corresponding to the current block may be fO representing a numerical value that needs to be subtracted from the weight matrix mWeight.

It should be noted that in an embodiment of the present application, the encoder may be set with different first offsets for encoding current blocks with different sizes. Specifically, the encoder may first determine the MIP block size index corresponding to the current block according to the size of the current block, and then may further determine the first offset corresponding to the current block according to the MIP block size index.

Further, in an embodiment of the present application, the MIP block size index of the current block is MipSizeId determined according to the size of the current block, and the first offset of the current block is fO which is the parameter that needs to be subtracted from the mWeight of the current block.

It may be understood that in an embodiment of the present application, when the encoder determines the MIP block size index corresponding to the current block according to the size of the current block, the following steps may specifically be performed:

(1) if the size of the current block is 4×4, the value of MipSizeId is 0;

(2) if the size of the current block is 4×8, 8×4 or 8×8, the value of MipSizeId is 1; and (3) if the current block has a size other than those mentioned above, the value of MipSizeId is 2.

Further, in an embodiment of the present application, the encoder may be preset with a correspondence relation between MipSizeId and fO, that is, the encoder is set with a correspondence relation between pre-stored indexes and offsets. Therefore, after determining the MIP block size index corresponding to the current block, the encoder may obtain, through mapping, the first offset corresponding to the current block based on the correspondence relation between pre-stored indexes and offsets.

It should be noted that in an embodiment of the present application, based on the correspondence relation between pre-stored indexes and offsets, the same MIP block size index corresponds to the same first offset. That is, in an embodiment of the present application, when the encoder encodes the current block using the MIP mode, the encoder may directly determine the first offset corresponding to the current block by using the MIP block size index corresponding to the current block, thereby further performing encoding processing by using the first offset.

In an embodiment of the present application, further, before encoding the current block according to the MIP mode, the encoder may first set the correspondence relation between the pre-stored indexes and offsets. That is, the encoder needs to set different fOs for different MipSizeIds first.

Further, in an embodiment of the present application, when the encoder sets the correspondence relation between the pre-stored indexes and offsets, for luma blocks with the same MipSizeId, the encoder may set the corresponding fOs of these luma blocks to the same numerical value. That is, in the present application, the encoder may uniformly set the fOs corresponding to the luma blocks with the same MipSizeId. For example, Table 10 shows a first correspondence relation between pre-stored indexes and offsets. As shown in Table 10, the encoder may directly set the same fO for the same MipSizeId, so that when encoding the current block, the encoder may directly determine the value of the corresponding first offset according to the MIP block size index corresponding to the current block. For example, if the size of the current block is 4×4, the encoder may determine that the value of the MIP block size index corresponding to the current block is 0, and then the encoder may determine that the first offset corresponding to the current block is 66 according to the correspondence relation between MipSizeId and fO shown in Table 10.

TABLE 10

| MipSizeId | fO |
|---|---|
| 0 | 66 |
| 1 | 45 |
| 2 | 46 |

Table 11 shows a second correspondence relation between pre-stored indexes and offsets. As shown in Table 11, the encoder may directly set the same fO for the same MipSizeId, so that when encoding the current block, the encoder may directly determine the value of the corresponding first offset according to the MIP block size index corresponding to the current block. For example, if the size of the current block is 4×4, the encoder may determine that the value of the MIP block size index corresponding to the current block is 0, and then the encoder may determine that the first offset corresponding to the current block is 34 according to the correspondence relation between MipSizeId and fO shown in Table 11.

TABLE 11

| MipSizeId | fO |
|---|---|
| 0 | 34 |
| 1 | 23 |
| 2 | 46 |

It can be seen that, compared with the above Table 9, in Table 10 and Table 11 in the present application, when determining the first offset corresponding to the current block, the encoder does not need to determine the first offset corresponding to the current block according to the values of the two variables MipSizeId and MIP mode number modeId, but may obtain the first offset corresponding to the current block only according to the parameter of MipSizeId, thereby reducing the complexity of the operation and also saving the storage overhead for storing a two-dimensional table of fO, such as Table 9.

Further, in an embodiment of the present application, when setting the correspondence relation between pre-stored indexes and offsets, the encoder may first determine, based on the original syntax description of fO, an fO with the largest numerical value among fOs corresponding to different MIP mode numbers modeIds of the same MipSizeId, and then determine the fO with the largest numerical value as the first offset corresponding to the MipSizeId. For example, based on the original syntax description of fO shown in Table 9, it may be determined that when MipSizeId is 0, the fO with the largest numerical value is 66 when the mode number modeId is 15. Therefore, the encoder may set the fOs corresponding to all mode numbers modeIds with MipSizeId of 0 to be 66, i.e., establish a correspondence relation between MipSizeId of 0 and fO of 66. Accordingly, based on the original syntax description of fO shown in Table 9, it may be determined that when MipSizeId is 1, the fO with the largest numerical value is 45 when the mode number modeId is 3. Therefore, the encoder may set the fOs corresponding to all mode numbers modeIds with MipSizeId of 1 to be 45, i.e., establish a correspondence relation between MipSizeId of 1 and fO of 45. Accordingly, based on the original syntax description of fO shown in Table 9, it may be determined that when MipSizeId is 2, the fO with the largest numerical value is 46 when the mode number modeId is 1. Therefore, the encoder may set the fOs corresponding to all mode numbers modeIds when MipSizeId is 2 to be 46, i.e., establish a correspondence relation between MipSizeId of 2 and fO of 46. In this way, the above Table 10 is obtained.

Specifically, before acquiring fO using the above Table 10 and Table 11, the encoder does not need to determine MipSizeId and modeId corresponding to the current block at the same time, and only needs to determine MipSizeId according to the size of the current block, thereby obtaining the fO corresponding to the current block.

It may be understood that in an embodiment of the present application, since the correspondence relation between MipSizeIds and fOs shown in Table 10 above is a one-dimensional array, the encoder may store the correspondence relation between MipSizeIds and fOs by using a one-dimensional array or a data structure with similar functions, which reduces the dimension of the array and saves the storage space occupied by the array itself, compared with Table 9 above.

In step 703, a second offset is calculated by using the first offset and reconstructed values of adjacent pixels corresponding to the current block.

In an embodiment of the present application, after determining the first offset according to the size of the current block, the encoder may obtain, by calculation, the second offset by using the first offset and the reconstructed values of the adjacent pixels corresponding to the current block. Here, the second offset may be oW in the above formula (2). Specifically, the second offset may be an offset for controlling bit-shift operation. For example, oW in the above Formula (2) is a rounded retention value, which may be calculated by the above formula (3).

It should be noted that in an embodiment of the present application, after determining the MIP block size index corresponding to the current block according to the size of the current block, and determining the first offset corresponding to the current block based on the correspondence relation between the pre-stored indexes and offsets, the encoder may obtain, by calculation, the second offset corresponding to the current block by using the first offset based on the above formula (3). Specifically, when determining the second offset, the encoder also needs to use the reconstructed values of adjacent pixels corresponding to the current block for calculation.

In step 704, a first prediction value of the current block is determined according to the second offset.

In an embodiment of the present application, after calculating the second offset based on the first offset and the reconstructed values of the adjacent pixels corresponding to the current block, the encoder may determine the first prediction value corresponding to the current block according to the second offset.

It should be noted that in an embodiment of the present application, when determining the first prediction value of the current block according to the second offset, the encoder may first calculate a second prediction value of a pixel at a preset position in the current block through the second offset, and then perform filtering on the second prediction value, thereby obtaining the first prediction values of all pixels in the current block.

Further, in an embodiment of the present application, the preset position may be a particular position in the current block. Specifically, the preset position may be particular positions of some pixels in the current block. That is, in the present application, the encoder calculates the second prediction value through the second offset, which is not the prediction values of all the pixels in the current block, but the prediction values of the pixels at some particular positions in the current block.

It should be noted that in an embodiment of the present application, after obtaining, by calculation, the second prediction values of the pixels at some particular positions in the current block through the second offset, the encoder may perform filtering on the second prediction values, thereby obtaining the prediction values of all the pixels in the current block, i.e., obtaining the first prediction values corresponding to the current block.

It may be understood that in an embodiment of the present application, the second offset may be used for controlling the offset of bit-shift operation in the process of calculating the second prediction values.

In step 705, the current block is encoded based on the first prediction value.

In an embodiment of the present application, after determining the first prediction value of the current block according to the second offset, the encoder may encode the current coding block based on the first prediction value, so as to obtain a bitstream corresponding to the current block.

Further, in an embodiment of the present application, when encoding the current block based on the first prediction value, the encoder may first calculate a residual between the original value and the first prediction value of the current block, and then may encode the residual.

It should be noted that in an embodiment of the present application, when encoding the current block, the encoder does not directly encode the first prediction value of the current block, but determines the difference, i.e., the residual, between the first prediction value and the original value corresponding to the current block, and then encodes the residual, thus effectively improving the encoding and decoding efficiency.

An embodiment of the present application provides a picture encoding method, in which an encoder determines a size of a current block; determines a first offset according to the size of the current block when encoding the current block by using an MIP mode; calculates a second offset by using the first offset and reconstructed values of adjacent pixels corresponding to the current block; determines a first prediction value of the current block according to the second offset; and encodes the current block based on the first prediction value. As can be seen, in the picture encoding method according to the present application, when encoding is performed using the MIP mode, the first offset corresponding to the current block may be directly determined according to the size of the current block, and then the current block may be encoded using the first offset. That is, in the present application, based on a correspondence relation between pre-stored indexes and offsets, the first offset corresponding to the MIP block size index may be directly obtained after the MIP block size index corresponding to the size of the current block is determined, so that the complexity of MIP algorithm is reduced at the time of performing encoding processing, the storage space and overall time required in the encoding process may be reduced on the premise of ensuring the encoding performance, thus the encoding efficiency may be effectively improved.

Based on the above embodiments, in a further embodiment of the present application, since the encoder is preset with the correspondence relation between pre-stored indexes and offsets, when encoding the current block, the encoder only needs to determine the MIP block size index corresponding to the current block according to the size of the current block, and then may determine the corresponding first offset by using the correspondence relation between pre-stored indexes and offsets. That is, in the present application, based on the correspondence relation between the pre-stored indexes and offsets, the encoder may directly determine the value of fO according to MipSizeId, rather than determine the value of fO according to the values of the two variables MipSizeId and modeId, which thereby can greatly reduce the complexity of operation and save the storage overhead for storing the two-dimensional table of the correspondence relation among MipSizeId, modeId and fO.

That is, in the prior art, fO in the above formula (2) represents the numerical value that needs to be subtracted from mWeight, and the value of fO of the current block can only be obtained by querying in the correspondence relation among MipSizeId, modeId and fO as shown in Table 9. As can be seen, the value of fO is related to both the size and the mode number of the current block, this results in an inconsistency in algorithm, and at the same time, the storage of the correspondence relation among MipSizeId, modeId and fO in Table 9 also requires a relatively large storage space. In contrast, in the present application, only the correspondence relation between MipSizeId and fO needs to be stored, and for the same MipSizeId, even if the modeId is different, the value of the corresponding fO is the same, which saves the storage space and also reduces the complexity of operation.

Specifically, in an embodiment of the present application, in terms of syntax, in the present application, the syntax of the prediction calculation process of MIP is simplified, and the fOs of the same MipSizeId are uniformly modified, that is, the corresponding fO may be determined only according to the size of the current block.

In an embodiment of the present application, further, when the encoder simplifies the syntax in the prediction calculation process of MIP, the fOs corresponding to any luma blocks with different MipSizeIds and different modeIds may be set to the same numerical value. That is, fO is a fixed value, the correlation between fO and the size of the luma block is cancelled, the fOs in all cases are defined as a uniform numerical value, and tables related to fO are no longer stored, thus further reducing the complexity of the algorithm of MIP, reducing the storage space for the algorithm, and making the implementation and the syntax of the MIP technology more concise and unified.

In an embodiment of the present application, further, in order to avoid a loss in encoding performance, the encoder needs to further modify the value of mWeight correspondingly while uniformly modifying fO. Specifically, after setting the correspondence relation between pre-stored indexes and offsets, the encoder may add an increased part of fO in a corresponding mode to each weight value in the weight matrix mWeight corresponding to the current block, i.e., it may add the updated fO to each original weight value in the original mWeight corresponding to the current block, thus keeping the encoding performance totally unchanged. That is, the encoder may also use fO to correspondingly update mWeight, thus reducing the storage space and reducing the complexity of operation while maintaining the encoding performance substantially unchanged and keeping the prediction calculation result unchanged.

It should be noted that, in an embodiment of the present application, when the encoder uses fO to update mWeight correspondingly, if there is a weight value in the updated mWeight that is greater than a preset weight threshold, the weight value may be set to be smaller than or equal to the preset weight threshold. For example, the encoder sets the preset weight threshold to the upper limit value of a 7-bit binary number, i.e., 127. If there is a weight value in the updated mWeight that is greater than 127, the weight value greater than 127 may be modified to be smaller than or equal to the preset weight threshold by clamping, for example, setting it to 127.

Further, in an embodiment of the present application, if there is a weight value in the updated mWeight that is greater than the preset weight threshold, it is also feasible to keep all the weight values in the updated mWeight within the range of the preset weight threshold by reducing sW.

Furthermore, in an embodiment of the present application, in order to better maintain the encoding performance, pseudo-codes shown in formula (9) may also be used to calculate the value of the parameter p[0], i.e., replacing formula (6) with formula (9). It may be understood that the dynamic range of data in the MIP matrix may be reduced by using the calculation method of formula (9):

$$p[0]=(1<<(\text{BitDepth}Y-1))-p\text{Temp}[0] \quad (9)$$

Illustratively, for luma blocks whose MipSizeIds have a value of 0, before the fOs are uniformly modified, the initial syntax description of fO is as shown in Table 12 below, in which values of fOs are different for different MIP mode numbers moldIds.

TABLE 12

| MipSizeId | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 |  | 34 | 21 | 7 | 27 | 27 | 28 | 56 | 13 | 47 | 15 | 40 | 21 | 16 | 7 | 45 | 66 | 21 | 32 |

Herein fO with the value of modeId being 1 is 21, and the corresponding mWeight is shown in Table 13 below.

TABLE 13

| 18 | 16 | 72 | 2 |
|---|---|---|---|
| 16 | 19 | 55 | 7 |
| 12 | 72 | 34 | 14 |
| 0 | 84 | 13 | 21 |
| 20 | 19 | 65 | 54 |
| 18 | 19 | 48 | 65 |
| 15 | 23 | 31 | 73 |
| 10 | 27 | 18 | 76 |
| 20 | 21 | 18 | 87 |
| 19 | 21 | 19 | 87 |
| 20 | 20 | 22 | 85 |
| 20 | 20 | 25 | 84 |
| 20 | 21 | 24 | 82 |
| 20 | 20 | 24 | 82 |

TABLE 13-continued

| 20 | 22 | 24 | 82 |
|---|---|---|---|
| 19 | 23 | 24 | 82 |

On the basis of the above Table 12, the corresponding original mWeight when the value of modeId is 1 may be obtained by using the fO having a value of 21 when the modeId is 1. Specifically, each weight value in the above Table 13 may be subjected to a subtraction operation with 21, thereby obtaining the corresponding original mWeight, as shown in Table 14 below.

TABLE 14

| −3 | −5 | 51 | −19 |
|---|---|---|---|
| −5 | −2 | 34 | −14 |
| −9 | 51 | 13 | −7 |
| −21 | 63 | −8 | 0 |
| −1 | −2 | 44 | 33 |
| −3 | −2 | 27 | 44 |
| −6 | 2 | 10 | 52 |
| −11 | 6 | −3 | 55 |
| −1 | 0 | −3 | 66 |
| −2 | 0 | −2 | 66 |
| −1 | −1 | 1 | 64 |
| −1 | −1 | 4 | 63 |
| −1 | 0 | 3 | 61 |
| −1 | −1 | 3 | 61 |
| −1 | 1 | 3 | 61 |
| −2 | 2 | 3 | 61 |

In an embodiment of the present application, at the time of updating the original mWeight corresponding to mWeight, in order to reduce the dynamic range of data in MIP matrix, the encoder replaces formula (6) with formula (9).

TABLE 15

| 3 | −5 | 51 | −19 |
|---|---|---|---|
| 5 | −2 | 34 | −14 |
| 9 | 51 | 13 | −7 |
| 21 | 63 | −8 | 0 |
| 1 | −2 | 44 | 33 |
| 3 | −2 | 27 | 44 |

TABLE 15-continued

| 6 | 2 | 10 | 52 |
|---|---|---|---|
| 11 | 6 | −3 | 55 |
| 1 | 0 | −3 | 66 |
| 2 | 0 | −2 | 66 |
| 1 | −1 | 1 | 64 |
| 1 | −1 | 4 | 63 |
| 1 | 0 | 3 | 61 |
| 1 | −1 | 3 | 61 |
| 1 | 1 | 3 | 61 |
| 2 | 2 | 3 | 61 |

Specifically, the first column of all original mWeights corresponding to all MIP mode numbers modeIds of the luma blocks whose MipSizeIds have the values of 0 and 1 need to be reversed. For example, after the weight values in the first column are reversed based on the above Table 14, the resultant preliminarily updated mWeights are as shown in Table 15.

As the maximum value of fO in Table 12 is 34 with the MIP mode number modeId being 0, when the encoder uniformly modifies fOs, it may directly set the fOs corresponding to all luma blocks with MipSizeId of 0 to be 34, that is, the syntax description of the updated fO is as shown in Table 16 below.

TABLE 16

| MipSizeId | fO |
|---|---|
| 0 | 34 |

Meanwhile, the encoder may continue to update, by using fO with a value of 34, the preliminarily updated mWeights of the luma block whose MIP mode number modeId is 1, i.e., based on the above Table 15, 34 is added to each weight value in Table 15, thereby obtaining the updated mWeights, which are as shown in Table 17.

TABLE 17

| | | | |
|---|---|---|---|
| 37 | 29 | 85 | 15 |
| 39 | 32 | 68 | 20 |
| 43 | 85 | 47 | 27 |
| 55 | 97 | 26 | 34 |
| 35 | 32 | 78 | 67 |
| 37 | 32 | 61 | 78 |
| 40 | 36 | 44 | 86 |
| 45 | 40 | 31 | 89 |
| 35 | 34 | 31 | 100 |
| 36 | 34 | 32 | 100 |
| 35 | 33 | 35 | 98 |
| 35 | 33 | 38 | 97 |
| 35 | 34 | 37 | 95 |
| 35 | 33 | 37 | 95 |
| 35 | 35 | 37 | 95 |
| 36 | 36 | 37 | 95 |

It may be understood that in this process, if there is a weight value in the updated mWeight that is greater than the preset weight threshold, the weight value may be clamped to fall within the range of the preset weight threshold, or all the weight values in the updated mWeight may be kept within the range of the preset weight threshold by reducing sW.

It may be understood from the above description that, in the present application, in an aspect, the encoder may realize, in encoding, that the value of fO of the current block is only related to the size of the current block by setting the pre-stored indexes and offsets, i.e., by setting the correspondence relation between MipSizeId and fO, thus making the implementation of MIP more concise and unified; in another aspect, the correspondence relation between MipSizeId and fO may be stored by using a one-dimensional array or a data structure with similar functions, which reduces the dimension and saves the storage space occupied by fO itself; and in another aspect, when the encoder uniformly modifies and updates fO, the corresponding mWeight may also be updated using the updated fO, thereby avoiding the reduction in encoding performance.

An embodiment of the present application provides a picture encoding method, in which an encoder determines a size of a current block; determines a first offset according to the size of the current block when encoding the current block by using an MIP mode; calculates a second offset by using the first offset and reconstructed values of adjacent pixels corresponding to the current block; determines a first prediction value of the current block according to the second offset; and encodes the current block based on the first prediction value. As can be seen, in the picture encoding method according to the present application, when encoding is performed using the MIP mode, the first offset corresponding to the current block may be directly determined according to the size of the current block, and then the current block may be encoded using the first offset. That is, in the present application, based on a correspondence relation between pre-stored indexes and offsets, after an MIP block size index corresponding to the size of the current block is determined, the first offset corresponding to the MIP block size index may be directly obtained, so that the complexity of MIP algorithm is reduced during encoding processing, the storage space and overall time required in the encoding process may be reduced on the premise of ensuring the encoding performance, thus the encoding efficiency may be effectively improved.

Figure 8:
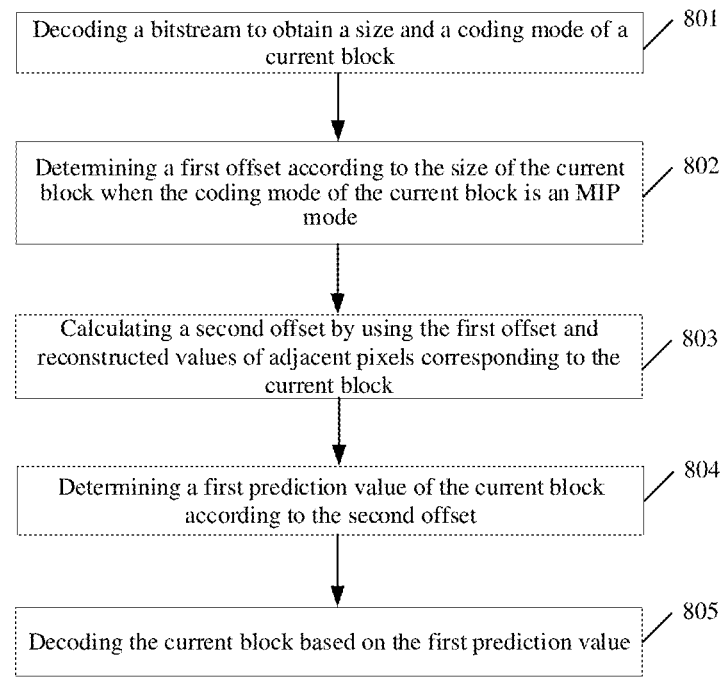
FIG. 8 is a schematic diagram of an implementation flow of a picture decoding method.

In another embodiment of the present application, FIG. 8 is a schematic diagram of an implementation flow of a picture decoding method. As shown in FIG. 8, in an embodiment of the present application, the picture decoding method performed by a decoder may include step 801 to step 805.

In step 801, a bitstream is decoded to obtain a size and a coding mode of a current block.

In an embodiment of the present application, the decoder may first determine the size and the coding mode of the current block, wherein the current block may be a current coding block to be decoded, that is, before the decoder decodes the current block, the specific size and coding mode of the current block may be determined first.

It should be noted that in an embodiment of the present application, coding modes of the current block may be 67 conventional intra prediction modes or MIP modes.

Further, in an embodiment of the present application, the current block may be a luma block to be decoded.

It should be noted that in an embodiment of the present application, according to a height parameter H and a width parameter W of the current block, the current block may have 25 sizes. Specifically, it is specified in a standard that the maximum size of the current block is 128×128. However, the maximum size of the transformation unit is 64×64, that is, the current block with the size of 128×128 must be subjected to quadtree partitioning first, so the maximum size of the current block is 64×64.

In step 802, a first offset is determined according to the size of the current block when the coding mode of the current block is an MIP mode.

In an embodiment of the present application, after determining that the coding mode of the current block is an MIP mode, the decoder may first determine the first offset corresponding to the current block according to the size of the current block. According to the above formula (2), the first offset corresponding to the current block may be fO representing a numerical value that needs to be subtracted from mWeight.

It should be noted that in an embodiment of the present application, the decoder may be set with different first offsets for decoding current blocks with different sizes. Specifically, the decoder may first determine a MIP block size index corresponding to the current block according to the size of the current block, and then may further determine the first offset corresponding to the current block according to the MIP block size index.

Further, in an embodiment of the present application, the MIP block size index of the current block is MipSizeId determined according to the size of the current block, and the first offset of the current block is fO which is the parameter that needs to be subtracted from the mWeight of the current block.

It may be understood that in an embodiment of the present application, when the decoder determines the MIP block size index corresponding to the current block according to the size of the current block, the following steps may specifically be performed:

(1) if the size of the current block is 4×4, the value of MipSizeId is 0;
(2) if the size of the current block is 4×8, 8×4 or 8×8, the value of MipSizeId is 1; and
(3) if the current block has a size other than those mentioned above, the value of MipSizeId is 2.

Further, in an embodiment of the present application, the decoder may be preset with a correspondence relation between MipSizeId and fO, that is, the decoder is set with a correspondence relation between pre-stored indexes and offsets. Therefore, after determining the MIP block size index corresponding to the current block, the decoder may obtain, by mapping, the first offset corresponding to the current block based on the correspondence relation between pre-stored indexes and offsets.

It should be noted that in an embodiment of the present application, based on the correspondence relation between pre-stored indexes and offsets, the same MIP block size index corresponds to the same first offset. That is, in an embodiment of the present application, when the decoder decodes the current block using the MIP mode, the decoder may directly determine the first offset corresponding to the current block by using the MIP block size index corresponding to the current block, thereby further performing decoding processing by using the first offset.

In an embodiment of the present application, further, before decoding the current block according to the MIP mode, the decoder may first set the correspondence relation between the pre-stored indexes and offsets. That is, the decoder needs to set different fOs for different MipSizeIds first.

Further, in an embodiment of the present application, when the decoder sets the correspondence relation between the pre-stored indexes and offsets, for luma blocks with the same MipSizeId, the decoder may set the corresponding fOs of these luma blocks to the same numerical value. That is, in the present application, the decoder may uniformly set the fOs corresponding to the luma blocks with the same MipSizeId. For example, in the above Table 10, if the size of the current block is 4×4, the decoder may determine that the MIP block size index corresponding to the current block is 0, and then the decoder may determine that the first offset corresponding to the current block is 66 according to the correspondence relation between MipSizeId and fO shown in Table 10; and in the above Table 11, if the size of the current block is 4×4, the decoder may determine that the value of the MIP block size index corresponding to the current block is 0, and then the encoder may determine that the first offset corresponding to the current block is 34 according to the correspondence relation between MipSizeId and fO shown in Table 11.

It can be seen that, compared with the above-mentioned Table 9, in Table 10 and Table 11 in the present application, when determining the first offset corresponding to the current block, the decoder does not need to determine the first offset corresponding to the current block according to the values of the two variables, i.e., MipSizeId and MIP mode number modeId, but may obtain the first offset corresponding to the current block only according to one parameter, i.e., MipSizeId, thereby reducing the complexity of the operation while saving the storage overhead for storing a two-dimensional table of fO, such as Table 9.

Further, in an embodiment of the present application, when setting the correspondence relation between pre-stored indexes and offsets, the decoder may first determine, based on an original syntax description of fO, an fO with the largest numerical value among fOs corresponding to different MIP mode numbers modeIds of the same MipSizeId, and then determine the fO with the largest numerical value as the first offset corresponding to the MipSizeId. For example, based on the original syntax description of fO shown in Table 9, it may be determined that when MipSizeId is 0, the fO with the largest numerical value is 66 when the mode number modeId is 15. Therefore, the decoder may set the fOs corresponding to all mode numbers modeIds with MipSizeId of 0 to be 66, i.e., establish a correspondence relation between MipSizeId of 0 and fO of 66. Accordingly, based on the original syntax description of fO shown in Table 9, it may be determined that when MipSizeId is 1, the fO with the largest numerical value is 45 when the mode number modeId is 3. Therefore, the decoder may set the fOs corresponding to all mode numbers modeIds with MipSizeId of 1 to be 45, i.e., establish a correspondence relation between MipSizeId of 1 and fO of 45. Accordingly, based on the original syntax description of fO shown in Table 9, it may be determined that when MipSizeId is 2, the fO with the largest numerical value is 46 when the mode number modeId is 1. Therefore, the decoder may set the fOs corresponding to all mode numbers modeIds when MipSizeId is 2 to be 46, i.e., establish a correspondence relation between MipSizeId of 2 and fO of 46. In this way, the above Table 10 is obtained.

Specifically, before acquiring fO using the above Table 10 and Table 11, the decoder does not need to determine MipSizeId and modeId corresponding to the current block at the same time, and only needs to determine MipSizeId according to the size of the current block, thereby obtaining the fO corresponding to the current block.

It may be understood that in an embodiment of the present application, since the correspondence relation between MipSizeIds and fOs shown in Table 10 above is a one-dimensional array, the decoder may store the correspondence relation between MipSizeIds and fOs by using a one-dimensional array or a data structure with similar functions, which reduces the dimension of the array and saves the storage space occupied by the array itself, compared with Table 9 above.

In step 803, a second offset is calculated by using the first offset and reconstructed values of adjacent pixels corresponding to the current block.

In an embodiment of the present application, after determining the first offset according to the size of the current block, the decoder may obtain, by calculation, the second offset by using the first offset and the reconstructed values of the adjacent pixels corresponding to the current block. Here, the second offset may be oW in the above formula (2). Specifically, the second offset may be an offset for controlling bit-shift operation. For example, oW in the above formula (2) is a rounded retention value, which may be calculated by the above formula (3).

It should be noted that in an embodiment of the present application, after determining the MIP block size index corresponding to the current block according to the size of the current block, and determining the first offset corresponding to the current block based on the correspondence relation between the pre-stored indexes and offsets, the decoder may obtain, by calculation, the second offset corresponding to the current block by using the first offset based on the above formula (3). Specifically, when determining the second offset, the decoder also needs to use the reconstructed values of adjacent pixels corresponding to the current block for performing the calculation.

In step 804, a first prediction value of the current block is determined according to the second offset.

In an embodiment of the present application, after calculating the second offset based on the first offset and the reconstructed values of the adjacent pixels corresponding to the current block, the decoder may determine the first prediction value corresponding to the current block according to the second offset.

It should be noted that in an embodiment of the present application, when determining the first prediction value of the current block according to the second offset, the decoder may first calculate a second prediction value of a pixel at a preset position in the current block through the second offset, and then perform filtering on the second prediction value, thereby obtaining the first prediction values of all the pixels in the current block.

Further, in an embodiment of the present application, the preset position may be a particular position in the current block. Specifically, the preset position may be particular positions of some pixels in the current block. That is, in the present application, the decoder calculates the second prediction value through the second offset, which is not the prediction values of all the pixels in the current block, but the prediction values of the pixels at some particular positions in the current block.

It should be noted that in an embodiment of the present application, after obtaining, by calculation, the second prediction values of the pixels at some particular positions in the current block through the second offset, the decoder may performing filtering on the second prediction values, thereby obtaining the prediction values of all the pixels in the current block, i.e., obtaining the first prediction values corresponding to the current block.

It may be understood that in an embodiment of the present application, the second offset may be used for controlling the offset of bit-shift operation in the process of calculating the second prediction values.

In step 805, the current block is decoded based on the first prediction value.

In an embodiment of the present application, after determining the first prediction value of the current block according to the second offset, the decoder may decode the current decoding block based on the first prediction value, so as to obtain a bitstream corresponding to the current block.

Further, in an embodiment of the present application, when decoding the current block based on the first prediction value, the decoder may first calculate a residual between the original value and the first prediction value of the current block, and then may decode the residual.

It should be noted that in an embodiment of the present application, when decoding the current block, the decoder does not directly decode the first prediction value of the current block, but determines the difference, i.e., the residual, between the first prediction value and the original value corresponding to the current block, and then decodes the residual, thus effectively improving the encoding and decoding efficiency.

Further, in an embodiment of the present application, before determining the reconstructed value of the current block based on the first prediction value, the decoder may obtain the residual of the current block by decoding the bitstream.

Accordingly, in an embodiment of the present application, after determining the residual of the current block and determining the first prediction value of the current block, the decoder may directly calculate a sum value of the first prediction value and the residual, and set the sum value as the reconstructed value of the current block. That is, when determining the reconstructed value of the current block based on the first prediction value, the decoder may perform an addition operation on the first prediction value and the residual to obtain the reconstructed value of the current block, so as to complete the decoding processing for the current block.

An embodiment of the present application provides a picture decoding method, in which a decoder decodes a bitstream to obtain a size and a coding mode of a current block; determines a first offset according to the size of the current block when the coding mode of the current block is an MIP mode; calculates a second offset by using the first offset and reconstructed values of adjacent pixels corresponding to the current block; determines a first prediction value of the current block according to the second offset; and determines a reconstructed value of the current block based on the first prediction value. As can be seen, in the picture decoding method according to the present application, when decoding is performed using the MIP mode, the first offset corresponding to the current block may be directly determined according to the size of the current block, and then the current block may be decoded using the first offset. That is, in the present application, based on a correspondence relation between pre-stored indexes and offsets, after an MIP block size index corresponding to the size of the current block is determined, the first offset corresponding to the MIP block size index may be directly obtained, so that the complexity of MIP algorithm is reduced during decoding processing, the storage space and overall time required in the decoding process may be reduced on the premise of ensuring the decoding performance, and the decoding efficiency may be effectively improved.

Figure 9:
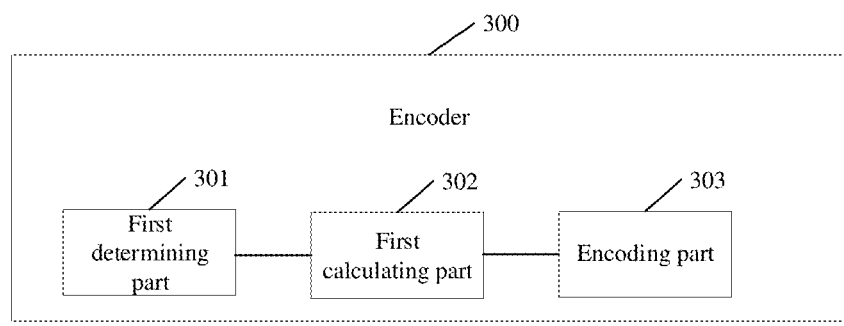
FIG. 9 is a first schematic diagram of a structure of an encoder.

Based on the above embodiments, in a further embodiment of the present application, FIG. 9 is a first schematic diagram of a structure of an encoder. As shown in FIG. 9, the encoder 300 according to an embodiment of the present application may include a first determining part 301, a first calculating part 302 and an encoding part 303.

The first determining part 301 is configured to determine a size of a current block, and determine a first offset according to the size of the current block when the current block is encoded by using an MIP mode;

The first calculating part 302 is configured to calculate a second offset by using the first offset and reconstructed values of adjacent pixels corresponding to the current block;

The first determining part 301 is further configured to determine a first prediction value of the current block according to the second offset; and The encoding part 303 is configured to encode the current block based on the first prediction value.

Figure 10:
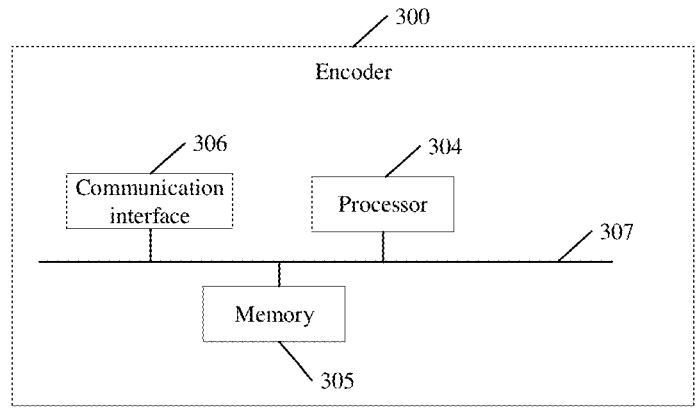
FIG. 10 is a second schematic diagram of a structure of an encoder.

FIG. 10 is a second schematic diagram of a structure of an encoder. As shown in FIG. 10, an encoder 300 according to an embodiment of the present application may further include a first processor 304, a first memory 305 configured to store instructions executable by the first processor 304, a first communication interface 306, and a first bus 307 configured to connect the first processor 304, the first memory 305 and the first communication interface 306.

Further, in an embodiment of the present application, the above first processor 304 is configured to determine a size of a current block; determine a first offset according to the size of the current block when the current block is encoded by using an MIP mode; calculate a second offset by using the first offset and reconstructed values of adjacent pixels corresponding to the current block; determine a first prediction value of the current block according to the second offset; and encode the current block based on the first prediction value.

In addition, various functional modules in this embodiment may be integrated in one processing unit, or various units may be physically presented separately, or two or more units may be integrated into one unit. The integrated unit may be implemented in a form of hardware, or may be implemented in a form of a software functional module.

Integrated units can be stored in a computer readable storage medium if they are implemented in the form of software functional modules and are not sold or used as independent products. Based on this understanding, the technical solution of the embodiment, in essence, or the part contributing to the prior art, or all or part of the technical solution, may be embodied in the form of a software product stored in a storage medium, including a number of instructions for causing a computer device (which may be a personal computer, a server, a network device or the like) or a processor to perform all or part of the acts of the method in the embodiment. The storage medium includes various mediums capable of storing program codes, such as a USB flash disk, a removable hard disk, a Read-Only Memory (ROM), a Random Access Memory (RAM), a magnetic disk, or an optical disk.

An embodiment of the present application provides an encoder. The encoder is configured to determine a size of a current block; determine a first offset according to the size of the current block when the current block is encoded by using an MIP mode; calculate a second offset by using the first offset and reconstructed values of adjacent pixels corresponding to the current block; determine a first prediction value of the current block according to the second offset; and encode the current block based on the first prediction value. As can be seen, in the picture encoding method according to the present application, when encoding is performed using the MIP mode, the first offset corresponding to the current block may be directly determined according to the size of the current block, and then the current block may be encoded using the first offset. That is, in the present application, based on a correspondence relation between pre-stored indexes and offsets, after an MIP block size index corresponding to the size of the current block is determined, the first offset corresponding to the MIP block size index may be directly obtained, so that the complexity of MIP algorithm is reduced during encoding processing, the storage space and overall time required in the encoding process may be reduced on the premise of ensuring the encoding performance, and the encoding efficiency may be effectively improved.

Figure 11:
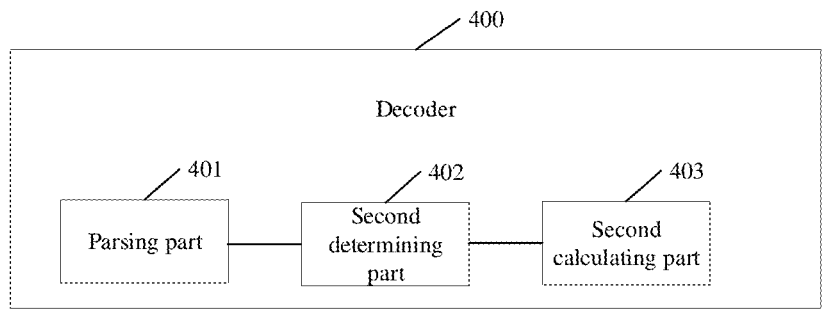
FIG. 11 is a first schematic diagram of a structure of a decoder.

Based on the above embodiments, in another embodiment of the present application, FIG. 11 is a first schematic diagram of a structure of a decoder. As shown in FIG. 11, the decoder 400 according to an embodiment of the present application may include a parsing part 401, a second determining part 402 and a second calculating part 403.

The parsing part 401 is configured to decode a bitstream to obtain a size and a coding mode of a current block; The second determining part 402 is configured to determine a first offset according to the size of the current block when the coding mode of the current block is an MIP mode;

The second calculating part 403 is configured to calculate a second offset by using the first offset and reconstructed values of adjacent pixels corresponding to the current block; and The second determining part 402 is further configured to determine a first prediction value of the current block according to the second offset, and determine a reconstructed value of the current block based on the first prediction value.

Figure 12:
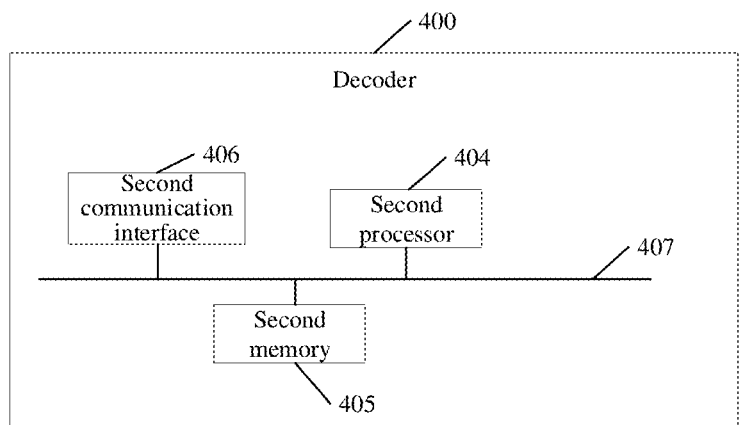
FIG. 12 is a second schematic diagram of a structure of a decoder.

FIG. 12 is a second schematic diagram of a structure of a decoder. As shown in FIG. 12, the decoder 400 according to an embodiment of the present application may further include a second processor 404, a second memory 405 configured to store instructions executable by the second processor 404, a second communication interface 406, and a second bus 407 configured to connect the second processor 404, the second memory 405 and the second communication interface 406.

Further, in an embodiment of the present application, the second processor 404 is configured to decode a bitstream to obtain a size and a coding mode of a current block; determine a first offset according to the size of the current block when the coding mode of the current block is an MIP mode; calculate a second offset by using the first offset and reconstructed values of adjacent pixels corresponding to the current block; determine a first prediction value of the current block according to the second offset; and determine a reconstructed value of the current block based on the first prediction value.

In addition, various functional modules in this embodiment may be integrated in one processing unit, or various units may be physically presented separately, or two or more units may be integrated into one unit. The integrated unit may be implemented in a form of hardware, or may be implemented in a form of a software functional module.

Integrated units can be stored in a computer readable storage medium if they are implemented in the form of software functional modules and are not sold or used as independent products. Based on this understanding, the technical solution of the embodiment, in essence, or the part contributing to the prior art, or all or part of the technical solution, may be embodied in the form of a software product stored in a storage medium, including a number of instructions for causing a computer device (which may be a personal computer, a server, a network device or the like) or a processor to perform all or part of the acts of the method in the embodiment. The storage medium includes various mediums capable of storing program codes, such as a USB flash disk, a removable hard disk, a Read-Only Memory (ROM), a Random Access Memory (RAM), a magnetic disk, or an optical disk.

An embodiment of the present application provides a decoder. The decoder is configured to decode a bitstream to obtain a size and a coding mode of a current block; determine a first offset according to the size of the current block when the coding mode of the current block is an MIP mode; calculate a second offset by using the first offset and reconstructed values of adjacent pixels corresponding to the current block; determine a first prediction value of the current block according to the second offset; and determine a reconstructed value of the current block based on the first prediction value. As can be seen, in the picture decoding method according to the present application, when decoding is performed using the MIP mode, the first offset corresponding to the current block may be directly determined according to the size of the current block, and then the current block may be decoded using the first offset. That is, in the present application, based on a correspondence relation between pre-stored indexes and offsets, after an MIP block size index corresponding to the size of the current block is determined, the first offset corresponding to the MIP block size index may be directly obtained, so that the complexity of MIP algorithm is reduced during decoding processing, the storage space and overall time required in the decoding process may be reduced on the premise of ensuring the decoding performance, and the decoding efficiency may be effectively improved.

An embodiment of the present application provides a computer-readable storage medium on which a program is stored, when the program is executed by a processor, the method described in an above embodiment is implemented.

Specifically, program instructions corresponding to a picture encoding method in an embodiment may be stored on a storage medium such as an optical disk, a hard disk, a USB flash disk, etc. When the program instructions in the storage medium that correspond to the picture encoding method are read or executed by an electronic device, the following steps are implemented: determining a size of a current block; determining a first offset according to the size of the current block when the current block is encoded by using an MIP mode; calculating a second offset by using the first offset and reconstructed values of adjacent pixels corresponding to the current block; determining a first prediction value of the current block according to the second offset; and encoding the current block based on the first prediction value.

Specifically, program instructions corresponding to a picture decoding method in the embodiment may be stored on a storage medium such as an optical disk, a hard disk, a USB flash disk, etc. When the program instructions in the storage medium that correspond to the picture decoding method are read or executed by an electronic device, the following steps are implemented: decoding a bitstream to obtain a size and a coding mode of a current block; determining a first offset according to the size of the current block when the coding mode of the current block is an MIP mode; calculating a second offset by using the first offset and reconstructed values of adjacent pixels corresponding to the current block; determining a first prediction value of the current block according to the second offset; and determining a reconstructed value of the current block based on the first prediction value.

It should be understood by a person skilled in the art that embodiments of the present application may be provided as methods, systems, or computer program products. Therefore, the present application may adopt the form of hardware embodiments, software embodiments, or embodiments combining software and hardware. Moreover, the present application may adopt the form of a computer program product implemented on one or more computer usable storage media (including, but not limited to, a magnetic disk memory, an optical memory, etc.) containing computer usable program codes.

The present application is described with reference to implementation flowcharts and/or block diagrams of methods, devices (systems), and computer program products according to embodiments of the present application. It should be understood that each flow and/or block in the flowchart and/or the block diagram, and combinations of flows and/or blocks in the flowchart and/or the block diagram may be implemented by computer program instructions. These computer program instructions may be provided to a processor of a general purpose computer, a special purpose computer, an embedded processor or another programmable data processing device to produce a machine, such that instructions which are executed by a processor of a computer or another programmable data processing device produce an apparatus for implementing a function specified in one or more flows in an implementation flowchart and/or one or more blocks in a block diagram.

These computer program instructions may also be stored in a computer-readable memory that can direct a computer or another programmable data processing device to operate in a particular manner, such that instructions stored in the computer-readable memory produce an article of manufacture including an instruction apparatus, wherein the instruction apparatus implements a function specified in one or more flows in the implementation flowchart and/or one or more blocks in the block diagram.

These computer program instructions may also be loaded onto a computer or another programmable data processing device to cause a series of operational acts to be performed on a computer or another programmable device to produce computer-implemented processing, such that instructions which are performed on the computer or the another programmable device provide acts for implementing a function specified in one or more flows in the implementation flowchart and/or one or more blocks in the block diagram.

The above descriptions are only preferred embodiments of the present application and are not intended to limit the protection scope of the present application.

INDUSTRIAL APPLICABILITY

The embodiments of the present application provide a picture encoding and decoding method, an encoder, a decoder and a storage medium. The encoder is configured to determine a size of a current block; determine a first offset according to the size of the current block when encoding the current block by using an MIP mode; calculate a second offset by using the first offset and reconstructed values of adjacent pixels corresponding to the current block; determine a first prediction value of the current block according to the second offset; and encode the current block based on the first prediction value. The decoder is configured to decode a bitstream to obtain a size and a coding mode of a current block; determine a first offset according to the size of the current block when the coding mode of the current block is an MIP mode; calculate a second offset by using the first offset and reconstructed values of adjacent pixels corresponding to the current block; determine a first prediction value of the current block according to the second offset; and determine a reconstructed value of the current block based on the first prediction value. As can be seen, in the picture encoding and decoding method according to the present application, when encoding and decoding are performed using an MIP mode, the first offset corresponding to the current block may be directly determined according to the size of the current block, and then the current block may be encoded or decoded using the first offset. That is, in the present application, based on a correspondence relation between pre-stored indexes and offsets, after an MIP block size index corresponding to the size of the current block is determined, the first offset corresponding to the MIP block size index may be directly obtained, so that the complexity of MIP algorithm is reduced during encoding or decoding processing, the storage space and overall time required in the encoding and decoding processes may be reduced on the premise of ensuring the encoding and decoding performance, and the encoding and decoding efficiency may be effectively improved.

What is claimed is:

1. A picture decoding method, applicable to a decoder, the method comprising:
   decoding a bitstream to obtain a size, a coding mode, and residuals of a current block;
   determining a first offset for calculating a second offset when the coding mode of the current block is a Matrix-based Intra Prediction (MIP) mode,
      calculating theft second offset based on the size of the current block, the first offset and reconstructed values of adjacent pixels corresponding to the current block;
   determining a first prediction value of the current block according to the second offset; and
   determining a reconstructed value of the current block based on the first prediction value.

2. The method of claim 1, further comprising:
   calculating a second prediction value of a pixel at a preset position in the current block through the second offset, wherein the preset position is a particular position in the current block; and
   performing linear interpolation on the second prediction value to obtain first prediction values in the current block.

3. The method of claim 2, further comprising:
   calculating sum values of the first prediction values and the residuals, and setting the sum values as reconstructed values of the current block.

4. The method of claim 1, wherein the first offset is a constant.

5. The method of claim 1, further comprising:
   determining an MIP block size index number corresponding to the current block according to the size of the current block; and
   determining the first offset according to the MIP block size index number.

6. The method of claim 5, wherein the determining the first offset according to the MIP block size index number comprises:
   determining the first offset corresponding to the MIP block size index number according to a correspondence relation between pre-stored index numbers and offsets.

7. The method of claim 2, wherein the calculating the second prediction value of the pixel at the preset position in the current block through the second offset comprises:
   performing bit-shift operation by using the second offset to obtain the second prediction value.

8. An encoder, comprising: a first processor, a first memory configured to store instructions executable by the first processor, a first communication interface, and a first bus configured to connect the first processor, the first memory and the first communication interface, wherein the first processor is configured to, when executing the instructions, perform steps of:
   determining a size of a current block;
   determining a first offset for calculating a second offset when encoding the current block by using a Matrix-based Intra Prediction (MIP) mode,
      calculating the second offset based on the size of the current block, thee first offset and reconstructed values of adjacent pixels corresponding to the current block;
   determining a first prediction value of the current block according to the second offset; and
   encoding the current block based on the first prediction value.

9. The method of claim 8, wherein the first processor is configured to, when executing the instructions, further perform steps of:
   calculating a second prediction value of a pixel at a preset position in the current block through the second offset, wherein the preset position is a particular position in the current block; and
   performing linear interpolation on the second prediction value to obtain first prediction values in the current block.

10. The encoder of claim 8, wherein the first offset is a constant.

11. The encoder of claim 8, wherein the first processor is configured to, when executing the instructions, further perform steps of:
    determining an MIP block size index number corresponding to the current block according to the size of the current block; and determining the first offset according to the MIP block size index number.

12. The encoder of claim 11, wherein the determining the first offset according to the MIP block size index number comprises: determining the first offset corresponding to the MIP block size index number according to a correspondence relation between pre-stored index numbers and offsets.

13. The encoder of claim 9, wherein the calculating the second prediction value of the pixel at the preset position in the current block through the second offset comprises:
    performing bit-shift operation by using the second offset to obtain the second prediction value.

14. A decoder, comprising: a second processor, a second memory configured to store instructions executable by the second processor, a second communication interface, and a second bus configured to connect the second processor, the second memory and the second communication interface, wherein the second processor is configured to, when executing the instructions, perform steps of:
    decoding a bitstream to obtain a size, a coding mode, and residuals of a current block;
    determining a first offset for calculating a second offset when the coding mode of the current block is a Matrix-based Intra Prediction (MIP) mode, calculating the second offset based on the size of the current block, theft first offset and reconstructed values of adjacent pixels corresponding to the current block;
    determining a first prediction value of the current block according to the second offset; and
    determining a reconstructed value of the current block based on the first prediction value.

15. The method of claim 14, wherein the second processor is configured to, when executing the instructions, further perform steps of:
    calculating a second prediction value of a pixel at a preset position in the current block through the second offset, wherein the preset position is a particular position in the current block; and
    performing linear interpolation on the second prediction value to obtain first prediction values in the current block.

16. The method of claim 15, wherein the second processor is configured to, when executing the instructions, further perform steps of:
    calculating sum values of the first prediction values and the residuals, and setting the sum values as reconstructed values of the current block.

17. The decoder of claim 14, wherein the first offset is a constant.

18. The decoder of claim 14, wherein the second processor is configured to, when executing the instructions, further perform steps of: determining an MIP block size index number corresponding to the current block according to the size of the current block; and
   determine the first offset according to the MIP block size index number.

19. The decoder of claim 18, wherein the determining the first offset according to the MIP block size index number comprises: determining the first offset corresponding to the MIP block size index number according to a correspondence relation between pre-stored index numbers and offsets.

20. The decoder of claim 15, wherein the calculating the second prediction value of the pixel at the preset position in the current block through the second offset comprises:
   performing bit-shift operation by using the second offset to obtain the second prediction value.

* * * * *